US008007931B2

(12) United States Patent
Lee et al.

(10) Patent No.: US 8,007,931 B2
(45) Date of Patent: Aug. 30, 2011

(54) MAGNETIC RECORDING MEDIUM

(75) Inventors: Hoo-san Lee, Osan-si (KR);
Chee-kheng Lim, Yongin-si (KR);
Hoon-sang Oh, Seongnam-si (KR);
Sok-hyun Kong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 11/698,081

(22) Filed: Jan. 26, 2007

(65) Prior Publication Data
US 2007/0212575 A1    Sep. 13, 2007

(30) Foreign Application Priority Data
Mar. 9, 2006    (KR) .................. 10-2006-0022323

(51) Int. Cl.
*G11B 5/66*    (2006.01)

(52) U.S. Cl. ........... 428/828.1; 428/827; 428/697; 428/836.1; 428/831; 428/832.2; 428/828; 428/829; 428/830; 428/212

(58) Field of Classification Search .............. None
See application file for complete search history.

(56) References Cited

U.S. PATENT DOCUMENTS

| | | | | |
|---|---|---|---|---|
| 4,687,712 A * | 8/1987 | Sugita et al. | ............... | 428/611 |
| 5,633,092 A * | 5/1997 | Gibbs | ............... | 428/611 |
| 6,002,553 A * | 12/1999 | Stearns et al. | ............... | 360/324 |
| 6,635,367 B2 * | 10/2003 | Igarashi et al. | ............... | 428/828 |
| 6,645,647 B1 * | 11/2003 | Litvinov et al. | ............... | 428/830 |
| 6,682,826 B2 * | 1/2004 | Shimizu et al. | ............... | 428/828 |
| 6,686,070 B1 * | 2/2004 | Futamoto et al. | ............... | 428/827 |
| 6,890,667 B1 | 5/2005 | Lairson et al. | | |
| 6,893,748 B2 * | 5/2005 | Bertero et al. | ............... | 428/828.1 |
| 2002/0048693 A1 * | 4/2002 | Tanahashi et al. | ............... | 428/694 TS |
| 2003/0035973 A1 * | 2/2003 | Trindade et al. | ............... | 428/494 |
| 2003/0214742 A1 * | 11/2003 | Kai et al. | ............... | 360/46 |
| 2005/0202286 A1 * | 9/2005 | Chen et al. | ............... | 428/831 |
| 2006/0166039 A1 * | 7/2006 | Berger et al. | ............... | 428/828.1 |
| 2007/0065681 A1 * | 3/2007 | Girt et al. | ............... | 428/828 |

FOREIGN PATENT DOCUMENTS

CN    1303090 A    7/2001
JP    10-228620    *    8/1998

OTHER PUBLICATIONS

Office Action issued Mar. 9, 2011 in counterpart Chinese Application No. 200610148546.7.

* cited by examiner

*Primary Examiner* — Timothy M Speer
*Assistant Examiner* — Vera Katz
(74) *Attorney, Agent, or Firm* — Sughrue Mion, PLLC

(57) ABSTRACT

A perpendicular magnetic recording medium including: a substrate; a perpendicular magnetic recording layer disposed over the substrate; a soft magnetic underlayer disposed between the substrate and the perpendicular magnetic recording layer; a shunting layer disposed under the soft magnetic underlayer; and an isolation layer disposed between the soft magnetic underlayer and the shunting layer and providing magnetic isolation between the shunting layer and the other layers disposed over the shunting layer are provided. The shunting layer is magnetically separated from the other magnetic layers disposed over the shunting layer, and shunts a magnetic field generated by the magnetic domain walls of the soft magnetic underlayer such that the magnetic field cannot reach a magnetic head, thereby increasing a signal-to-noise ratio (SNR).

4 Claims, 5 Drawing Sheets
(1 of 5 Drawing Sheet(s) Filed in Color)

MAGNETIC RECORDING MEDIUM

CROSS-REFERENCE TO RELATED PATENT APPLICATION

This application claims priority from Korean Patent Application No. 10-2006-0022323, filed on Mar. 9, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a magnetic recording medium, and more particularly, to a magnetic recording medium that can reduce magnetic noise generated by magnetic domain walls.

2. Description of the Related Art

It is generally known that perpendicular magnetic recording achieves higher recording density than longitudinal magnetic recording. Accordingly, the perpendicular recording technology is adopted in most hard Disk Drives (HDDs) to achieve high recording densities today.

In perpendicular magnetic recording, the magnetization of bits of data is aligned in a direction perpendicular to the plane of a corresponding recording medium. Such perpendicular magnetic recording is performed using a double-layered perpendicular magnetic recording medium, which includes a ferromagnetic layer and a soft magnetic underlayer (SUL), and a pole head. The SUL, which is inevitably used due to the magnetic characteristics of the pole head, is disposed under a magnetic recording layer and guides a magnetic flux that adversely results in noise being generated by magnetic domain walls.

Various methods have been proposed to reduce noise generated by magnetic domain walls. Among the methods, there is a related art method of reducing noise generated by magnetic domain walls by forming a recording medium having a multi-layered underlayer structure and establishing an exchange coupling between underlayers. Another related art method is to prevent the formation of magnetic domain walls due to the exchange bias of a ferromagnetic layer by forming the ferromagnetic layer under an underlayer. Another related art method is to prevent the formation of magnetic domains by forming a magnetic domain control layer under an SUL. Various other methods of reducing noise have been suggested, but so far none have managed to address the problems of noise brought about by increasing recording densities of perpendicular magnetic recording mediums.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a perpendicular magnetic recording medium that can effectively reduce noise generated by magnetic domain walls.

According to an aspect of the present invention, there is provided a perpendicular magnetic recording medium including: a substrate; a perpendicular magnetic recording layer disposed over the substrate; a soft magnetic underlayer disposed between the substrate and the perpendicular magnetic recording layer; a shunting layer disposed under the soft magnetic underlayer; and an isolation layer disposed between the soft magnetic underlayer and the shunting layer and providing magnetic isolation between the shunting layer and the other layers disposed over the shunting layer.

The shunting layer may be formed of one selected from CoZrNb, NiFe, CoFe, and CoFeB.

The perpendicular magnetic recording medium may further include a ferromagnetic layer disposed between the soft magnetic underlayer and the shunting layer.

The soft magnetic underlayer may have a multi-layered structure in which unit soft magnetic underlayers are stacked and a spacer is disposed between adjacent unit soft magnetic underlayers.

The perpendicular magnetic recording medium may further include a soft magnetic alignment layer disposed between the soft magnetic underlayer and the isolation layer.

The perpendicular magnetic recording medium may further include a perpendicular alignment layer disposed between the perpendicular magnetic recording layer and the soft magnetic underlayer.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other features of the present invention will become more apparent by describing in detail exemplary embodiments thereof with reference to the attached drawings in which.

DETAILED DESCRIPTION OF THE EXEMPLARY EMBODIMENTS OF THE PRESENT INVENTION

The present invention will now be described more fully with reference to the accompanying drawings, in which exemplary embodiments of the invention are shown.

Figure 1:
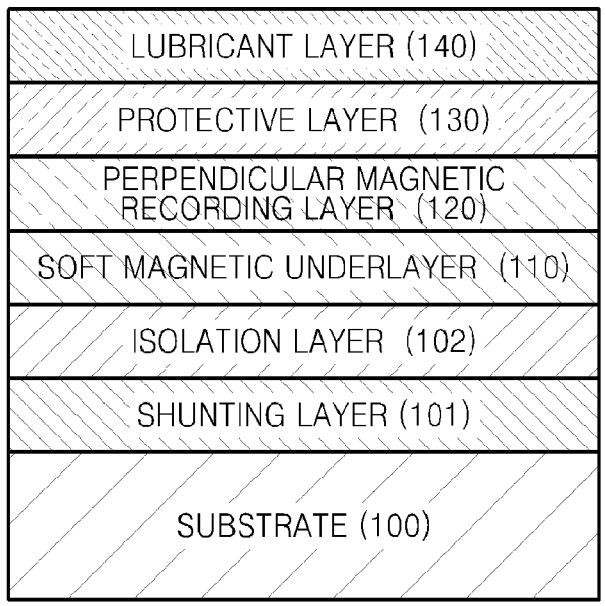
FIG. 1 is a cross-sectional view of a perpendicular magnetic recording medium according to an exemplary embodiment of the present invention.
Figure 2:
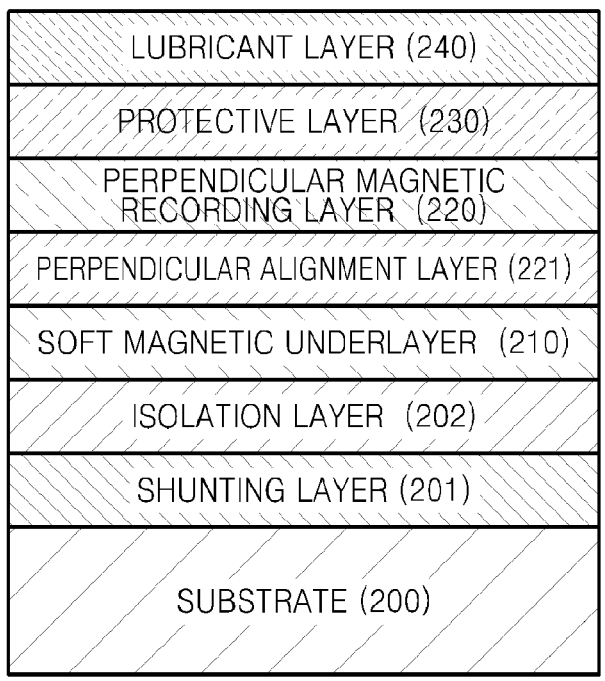
FIG. 2 is a cross-sectional view of a perpendicular magnetic recording medium according to another exemplary embodiment of the present invention.

FIGS. 1 and 2 are cross-sectional views of a double-layered perpendicular magnetic recording medium including a soft magnetic underlayer (SUL) according to exemplary embodiments of the present invention.

Referring to FIG. 1, a perpendicular magnetic recording layer 120 on which information is recorded is disposed over a substrate 100, and an SUL 110 is disposed under the perpendicular magnetic recording layer 120 to form a path of a magnetic field in a direction perpendicular to the perpendicular magnetic recording layer 120 and enable information to be recorded on the perpendicular magnetic recording layer 120.

A protective layer 130 is disposed on the perpendicular magnetic recording layer 120 to protect the perpendicular magnetic recording layer 120 from external influences, and a lubricant layer 140 is disposed on the protective layer 130 to reduce wear resulting from contact between a magnetic head of a hard disk drive (HDD) and the protective layer 130.

The lubricant layer 140 is formed of tetraol, the protective layer 130 is formed of diamond-like carbon (DLC), the perpendicular magnetic recording layer 120 is formed of one selected from $CoCrPtSiO_2$, CoPt, CoCrPt, and FePt, the SUL 110 is formed of CoZrNb or CoFeB, and the substrate 100 is formed of glass or Al—Mg.

In addition, a shunting layer 101 and an isolation layer 102, which characterize the current exemplary embodiment of the present invention, are disposed between the SUL 110 and the substrate 100. The isolation layer 102 is formed of a nonmagnetic material, such as Ta or Ti, prevents magnetic interaction between the SUL, 110 and the shunting layer 101, and has a thickness sufficient enough to provide magnetic isolation. The shunting layer 101 is formed of a soft magnetic material having high magnetic permeability and high saturation magnetization, Such as CoZrNb, NiFe, CoFe, or CoFeB.

Referring to FIG. 2, a perpendicular magnetic recording layer 220 on which information is recorded is disposed over a substrate 200, and a perpendicular alignment layer 221 formed of Ru or NiFe is disposed under the perpendicular magnetic recording layer 220 to perpendicularly align the magnetic alignment of the perpendicular magnetic recording layer 220. An SUL 210 is disposed under the perpendicular alignment layer 221 to form a path of a magnetic field in a direction perpendicular to the perpendicular magnetic recording layer 220 and enable information to be recorded on the perpendicular magnetic recording layer 220.

A protective layer 230 is disposed on the perpendicular magnetic recording layer 220 to protect the perpendicular magnetic recording layer 220 from external influences, and a lubricant layer 240 is disposed on the protective layer 230 to reduce wear resulting from contact between a magnetic head of an HDD and the protective layer 230.

In addition, a shunting layer 201 and an isolation layer 202, which characterize the current exemplary embodiment of the present invention, are disposed between the SUL, 210 and the substrate 200. The isolation layer 202 prevents magnetic interaction between the SUL 210 and the shunting layer 201, and has a thickness sufficient enough to provide magnetic isolation. The shunting layer 201 is formed of a soft magnetic material having high magnetic permeability and high saturation magnetization, such as CoZrNb, NiFe, CoFe, or CoFeB.

The path of the perpendicular magnetic field output from the magnetic head when a perpendicular magnetic recording operation is performed using the magnetic head is formed in the SULs 110 and 210 of FIGS. 1 and 2, thereby enabling information to be recorded on the perpendicular magnetic recording layers 120 and 220. However, the SULs 110 and 210 may decrease a signal-to-noise ratio (SNR) because noise generated by the SULs 110 and 210 is high when reading a magnetic pattern recorded on the perpendicular magnetic recording layers 120 and 220. However, according to the present exemplary embodiments, the shunting layers 101 and 201 disposed under the SULs 110 and 210 shunt a magnetic flux that results in noise generated by the magnetic domain walls of the SULs 110 and 210, such that the magnetic flux does not reach the magnetic head and the SNR is increased. Although not shown in FIGS. 1 and 2, an intermediate layer is disposed between the SUL 110 or 210 and the perpendicular magnetic recording layer 120 or 220. The perpendicular alignment layer 221 in FIG. 2 may act as the intermediate layer.

Figure 3:
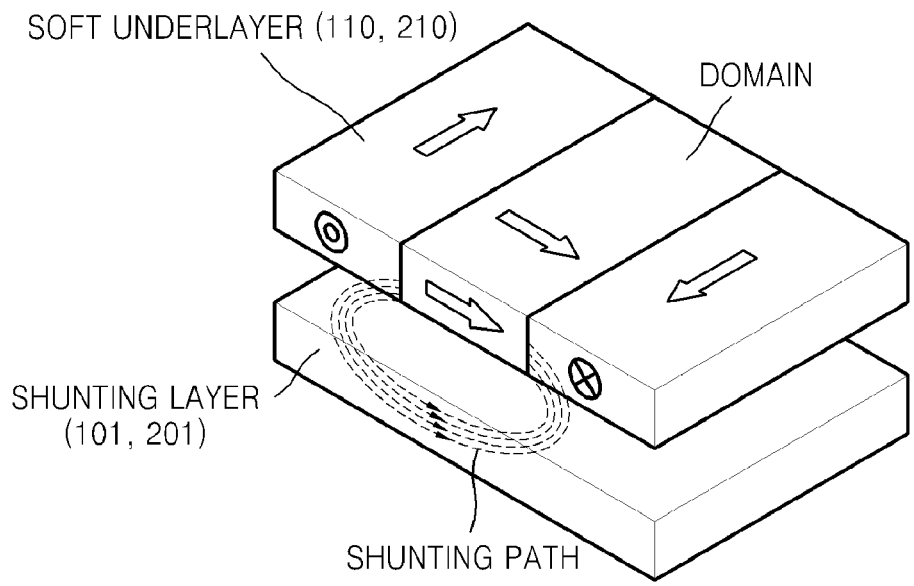
FIG. 3 is a perspective view illustrating the function of a shunting layer of a perpendicular magnetic recording medium, according to the exemplary embodiments of the present invention.

FIG. 3 is a perspective view illustrating the function of a shunting layer according to the exemplary embodiments of the present invention. Magnetic domain walls are formed between adjacent magnetic domains in the magnetically isolated SUL 110 or 210, and thus a magnetic flux is generated in a direction perpendicular to the soft underlayer 110 or 210. The path of the magnetic flux is shunted through the shunting layer 101 or 201 formed under the SUL 110 or 210 such that no magnetic flux from the magnetic domain walls of the SUL 110 or 210 flows toward a magnetic head of an HDD and noise is prevented from being generated by the magnetic domain walls of the SUL 110 or 210. If the shunting layer 101 or 201 is not magnetically isolated from the SUL, 110 or 210, an exchange coupling between the shunting layer 101 or 201 and the SUL 110 or 210 is established, thereby making it impossible to effectively shunt magnetic flux.

Figure 4:
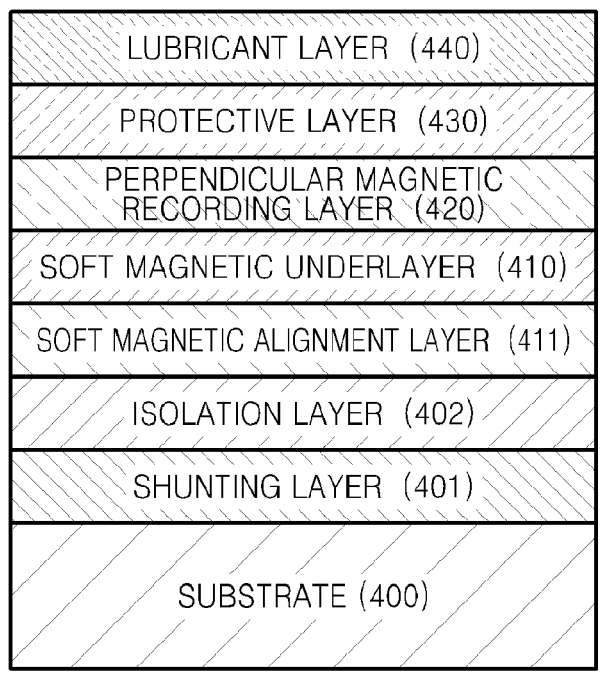
FIG. 4 is a cross-sectional view of a perpendicular magnetic recording medium according still another exemplary embodiment of the present invention.
Figure 5:
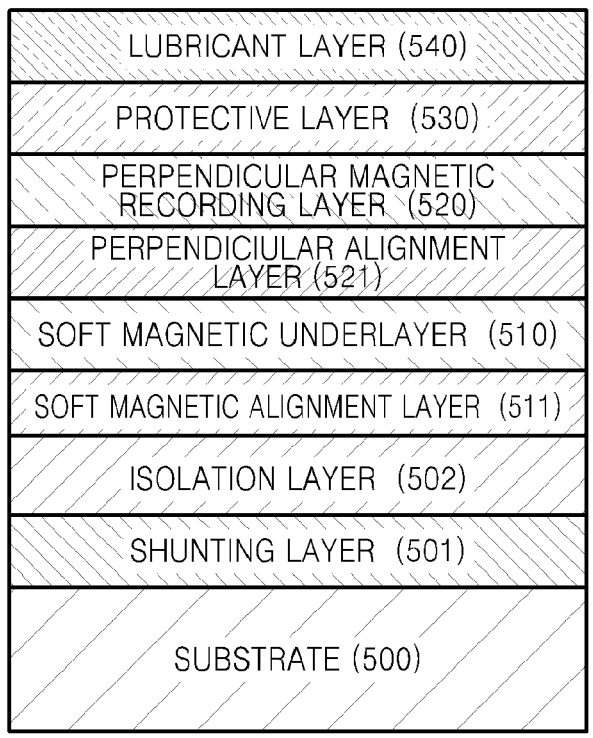
FIG. 5 is a cross-sectional view of a perpendicular magnetic recording medium according yet another exemplary embodiment of the present invention.

FIGS. 4 and 5 are cross-sectional views of perpendicular magnetic recording mediums each including a shunting layer and an isolation layer according other exemplary embodiments of the present invention.

Referring to FIG. 4, a perpendicular magnetic recording layer 420 on which information is recorded is disposed over a substrate 400, and an SUL 410 is disposed under the perpendicular magnetic recording layer 420 to form a path of a magnetic field in a direction perpendicular to the perpendicular magnetic recording layer 420 and enable information to be recorded on the perpendicular magnetic recording layer 420. A soft magnetic alignment layer 411 is disposed under the SUL 410.

A protective layer 430 is disposed on the perpendicular magnetic recording layer 420 to protect the perpendicular magnetic recording layer 420 from external influences, and a lubricant layer 440 is disposed on the protective layer 430.

In addition, a shunting layer 401 and an isolation layer 402, which characterize the current exemplary embodiment of the present invention, are disposed between the soft magnetic alignment layer 411 and the substrate 400. The isolation layer 402 prevents magnetic interaction between the soft magnetic alignment layer 411 and the shunting layer 401, and has a thickness sufficient enough to provide magnetic isolation. The shunting layer 401 is formed of a soft magnetic material having high magnetic permeability and high saturation magnetization, such as CoZrNb, NiFe, CoFe, or CoFeB, and has a thickness of between tens to hundreds of nanometers (nm).

Referring to FIG. 5, a perpendicular magnetic recording layer 520 on which information is recorded is disposed over a substrate 500, and a perpendicular alignment layer 521 is disposed under the perpendicular magnetic recording layer 520 to perpendicularly align the magnetic alignment of the perpendicular magnetic recording layer 520. An SUL, 510 is disposed under the perpendicular alignment under 521 to form a path of a magnetic field in a direction perpendicular to the perpendicular magnetic recording layer 520 and enable information to be recorded on the perpendicular magnetic recording layer 520. A soft magnetic alignment layer 511 is disposed under the SUL 510.

A protective layer 530 is disposed on the perpendicular magnetic recording layer 520 to protect the perpendicular magnetic recording layer 520 from external influences, and a lubricant layer 540 is disposed on the protective layer 530.

In addition, a shunting layer 501 and an isolation layer 502, which characterize the current exemplary embodiment of the present invention, are disposed between the soft magnetic alignment layer 511 and the substrate 500. The isolation layer 502 prevents magnetic interaction between the soft magnetic alignment layer 511 and the shunting layer 501, and has a sufficient thickness to provide magnetic isolation. The shunting layer 501 is disposed of a soft magnetic material having high magnetic permeability and high saturation magnetization, such as CoZrNb, NiFe, CoFe, or CoFeB.

Noise generated by the SUL 410 or 510 can be minimized by depositing the soft magnetic alignment layer 411 or 511 under the SUL 410 or 510, minimizing the thickness of the SUL 410 or 510, and achieving stable soft magnetic characteristics. In general, the SUL 410 or 510 has a specific crystal structure. If the SUL 410 or 510 is directly deposited on the substrate 400 or 500, the SUL 410 or 510 will be formed in a non-uniform and unstable manner to have a thick initial growth layer. In this case, since the initial growth layer is magnetically unstable, it is difficult to form a regular path of a magnetic field from the magnetic head. Accordingly, a soft magnetic material should be deposited thickly enough to form a stable SUL on the initial growth layer. However, a thick SUL included in a magnetic recording medium increases noise from the magnetic recording medium during reading the information. The exemplary embodiments of the present invention decrease the thickness of the SUL 410 or 510 to reduce such noise by disposing the soft magnetic alignment layer 411 or 511 under the SUL 410 or 510. Also, the shunting layer 401 or 501 disposed under the soft magnetic alignment layer 411 or 511 shunts noise generated by the magnetic domain walls of the SUL 410 or 510. Accordingly, a SNR of the perpendicular magnetic recording media of FIGS. 4 and 5 can be greater than the SNR of the perpendicular magnetic recording media of FIGS. 1 and 2.

Figure 6:
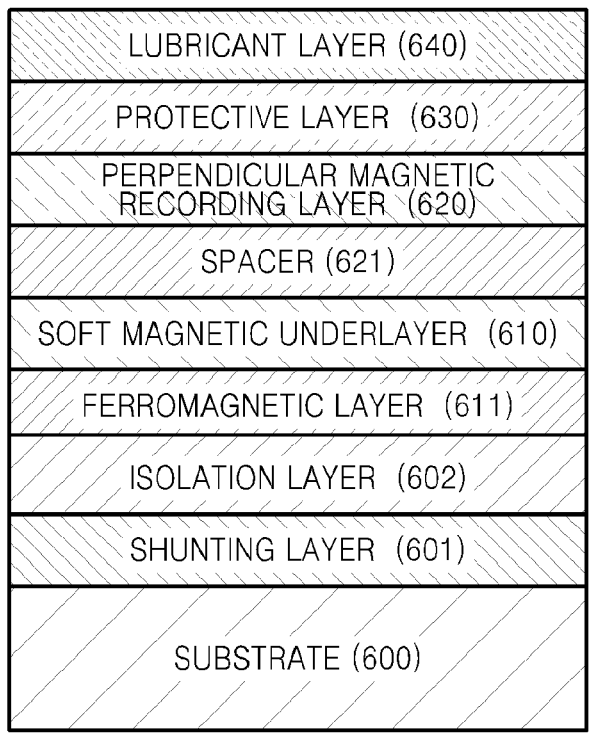
FIG. 6 is a cross-sectional view of a perpendicular magnetic recording medium according a further exemplary embodiment of the present invention.

FIG. 6 is a cross-sectional view of a perpendicular magnetic recording medium according to a further exemplary embodiment of the present invention.

Referring to FIG. 6, a perpendicular magnetic recording layer 620 on which information is recorded and an SUL 610 are disposed over a substrate 600. A non-magnetic spacer 621 is disposed between the perpendicular magnetic recording layer 620 and the SUL 610. A ferromagnetic layer 611 is disposed under the SUL 610 to control the magnetic domains of the SUL 610. A protective layer 630 is disposed on the perpendicular magnetic recording layer 620 to protect the perpendicular magnetic recording layer 620 from external influences, and a lubricant layer 640 is disposed on the protective layer 630.

In addition, a shunting layer 601 and an isolation layer 602, which are the feature of the current exemplary embodiment of the present invention, are interposed between the ferromagnetic layer 611 and the substrate 600. The isolation layer 602 prevents magnetic interaction between the ferromagnetic layer 611 and the shunting layer 601, and has a thickness sufficient enough to provide magnetic isolation. The shunting layer 601 is formed of a soft magnetic material having high magnetic permeability and high saturation magnetization, such as CoZrNb, NiFe, CoFe, or CoFeB, and has a thickness of tens to hundreds of nanometers (nm).

The ferromagnetic layer 611 reduces noise by controlling the magnetic domains of the SUL 610, and also the shunting layer 601 shunts noise generated by the magnetic domain walls of the SUL 610. Although not shown in FIGS. 4, 5, and 6, an intermediate layer may be disposed between the SUL 410, 510, or 610 and the perpendicular magnetic recording layer 420, 520, or 620. The perpendicular alignment layer 521 in FIG. 5 and the non-magnetic spacer 621 in FIG. 6 act as the intermediate layers.

Figure 7:
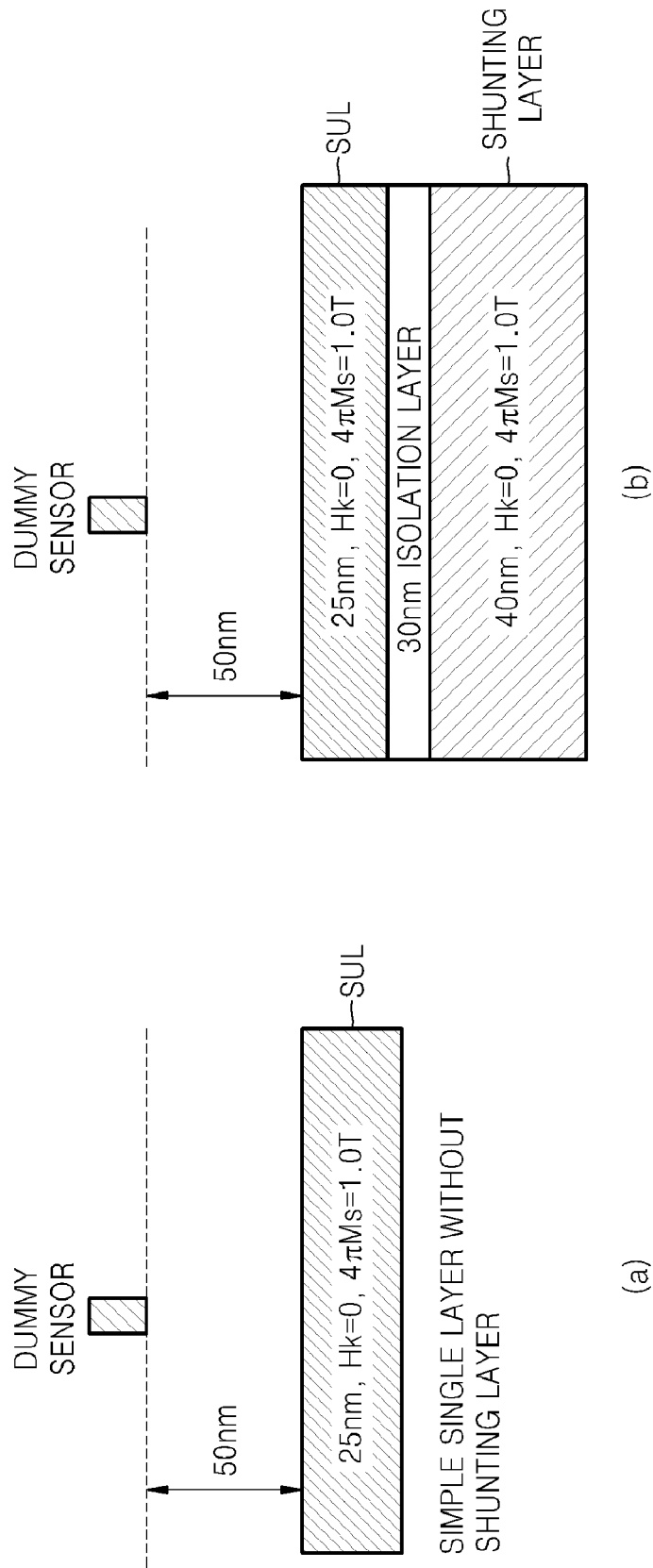
FIG. 7 is a diagram of an experimental configuration including a related art perpendicular magnetic recording medium structure (a) and a perpendicular magnetic recording medium structure (b) according to an exemplary embodiment of the present invention for comparing SNRs thereof.

FIG. 7 is a diagram of an experimental configuration including a related art perpendicular magnetic recording medium structure (a) and a perpendicular magnetic recording medium structure (b) according to the exemplary embodiment of the present invention for comparing SNRs thereof.

Simulation was performed assuming that each of the structures (a) and (b) has an SUL with a thickness of approximately 25 nm, an anisotropy field $H_k$ of zero (0), and a saturation magnetization 4 $\pi$Ms of 1.0 T; and a sensor for detecting magnetic field was at a distance of approximately 50 nm from the SUL. Also, it is assumed in the structure (b) that a shunting layer having an anisotropy field $H_k$ of zero (0) and a saturation magnetization 4 $\pi$Ms of 1.0 T is disposed under the SUL and an isolation layer with a thickness of approximately 30 nm is interposed between the SUL and the shunting layer.

Figure 8A:
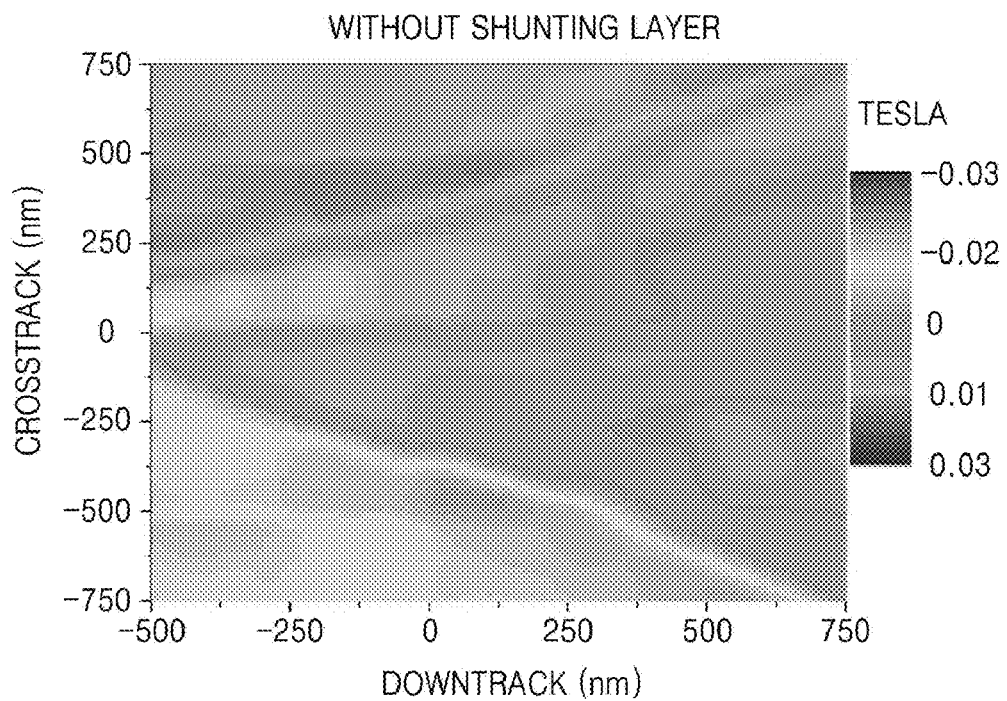
FIGS. 8A and 8B illustrate simulation results illustrating noises of the related art structure and the structure according to an exemplary embodiment of the present invention.
Figure 8B:
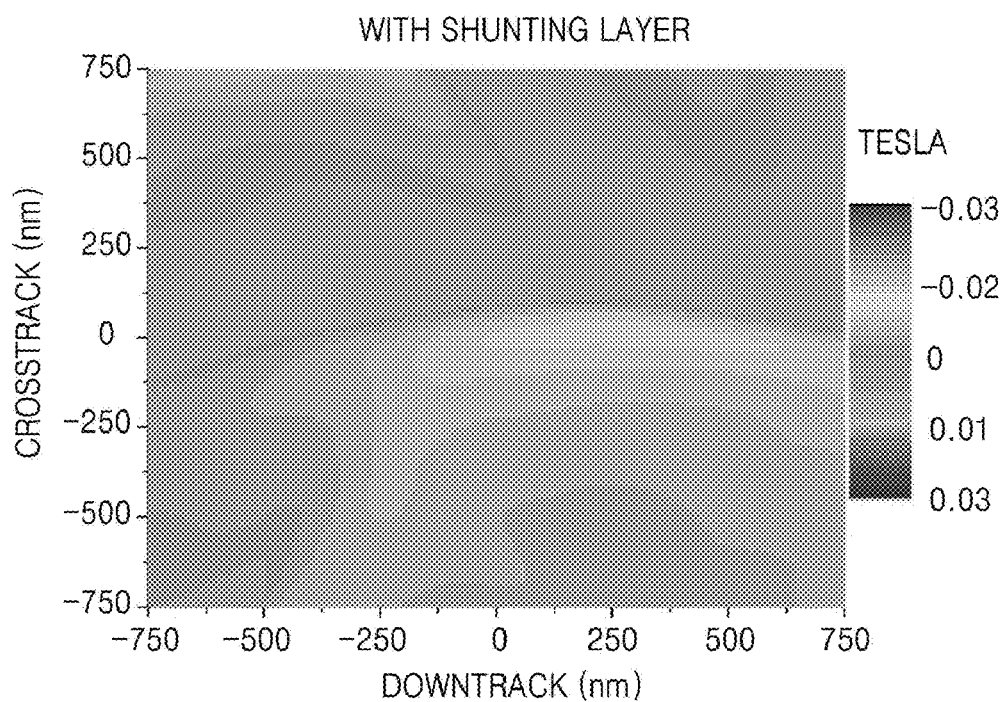

FIGS. 8A and 8B are images of simulation results illustrating magnetic domain wall noises of the structures (a) and (b) of FIG. 7. Referring to FIGS. 8A and 8B, the structure (b) according to the exemplary embodiment of the present invention exhibits significantly suppressed noise when compared to the structure (a).

Various types of perpendicular magnetic recording media have been explained in the above exemplary embodiments. According to the present invention, the shunting layer disposed under the noise source, such as the SUL, shunts a magnetic flux that results in noise generated by the noise source. Accordingly, various other exemplary embodiments can be implemented without departing from the scope of the present invention.

In particular, the above exemplary embodiments have shown a basic structure of a perpendicular magnetic recording medium, and thus auxiliary or additional layers may be further stacked. For example, the SUL may have a multi-layered structure, in which a plurality of unit SULs are formed and a spacer is interposed between adjacent unit SULs, without limiting the technical scope of the present invention. Also, the materials of the constituent elements of the perpendicular magnetic recording medium according to the exemplary embodiments of the present invention are well known and do not limit the technical scope of the present invention.

As described above, according to the present invention, noise resulting from the SUL can be remarkably reduced and thus an SNR and recording density can be increased. Also, the SUL can be thinly formed due to the increased recording density, leading to higher growth productivity.

The present invention is suitable for any type of perpendicular magnetic recording media employing SULs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A perpendicular magnetic recording medium comprising:

a substrate;

a perpendicular magnetic recording layer disposed over the substrate;

a soft magnetic underlayer disposed between the substrate and the perpendicular magnetic recording layer;

a magnetic noise shunting layer disposed under the soft magnetic underlayer, having a higher saturation magnetization value than that of the soft magnetic layer and shunting a magnetic flux that results in noise generated by the magnetic domain walls of the soft magnetic underlayer;

an isolation layer disposed between the soft magnetic underlayer and the shunting layer and preventing exchange coupling between the shunting layer and the soft magnetic underlayer; and, a ferromagnetic layer disposed between the soft magnetic underlayer and the shunting layer, wherein the soft magnetic underlayer has a multi-layered structure in which unit soft magnetic underlayers are stacked and a spacer is disposed between adjacent unit soft magnetic underlayers.

2. A perpendicular magnetic recording medium comprising:

a substrate;

a perpendicular magnetic recording layer disposed over the substrate;

a soft magnetic underlayer disposed between the substrate and the perpendicular magnetic recording layer;

a magnetic noise shunting layer disposed under the soft magnetic underlayer, having a higher saturation magnetization value than that of the soft magnetic layer and shunting a magnetic flux that results in noise generated by the magnetic domain walls of the soft magnetic underlayer; and an isolation layer disposed between the soft magnetic underlayer and the shunting layer and preventing exchange coupling between the shunting layer and the soft magnetic underlayer, wherein the shunting layer is formed of one selected from the group consisting of CoZrNb, NiFe, CoFe, and CoFeB, and the soft magnetic underlayer has a multi-layered structure in which unit soft magnetic underlayers are stacked and a spacer is disposed between adjacent unit soft magnetic underlayers.

3. A perpendicular magnetic recording medium comprising:

a substrate;

a perpendicular magnetic recording layer disposed over the substrate;

a soft magnetic underlayer disposed between the substrate and the perpendicular magnetic recording layer;

a magnetic noise shunting layer disposed under the soft magnetic underlayer, having a higher saturation magnetization value than that of the soft magnetic layer and shunting a magnetic flux that results in noise generated by the magnetic domain walls of the soft magnetic underlayer; and an isolation layer disposed between the soft magnetic underlayer and the shunting layer and preventing exchange coupling between the shunting layer and the soft magnetic underlayer, wherein the soft magnetic underlayer has a multi-layered structure in which unit soft magnetic underlayers are stacked and a spacer is disposed between adjacent unit soft magnetic underlayers.

4. A perpendicular magnetic recording medium comprising:

a substrate;

a perpendicular magnetic recording layer disposed over the substrate;

a soft magnetic underlayer disposed between the substrate and the perpendicular magnetic recording layer;

a magnetic noise shunting layer disposed under the soft magnetic underlayer, having a higher saturation magnetization value than that of the soft magnetic layer and shunting a magnetic flux that results in noise generated by the magnetic domain walls of the soft magnetic underlayer; and an isolation layer disposed between the soft magnetic underlayer and the shunting layer and preventing exchange coupling between the shunting layer and the soft magnetic underlayer, wherein the shunting layer is formed of one selected from the group consisting of CoZrNb, NiFe, CoFe, and CoFeB, and the soft magnetic underlayer has a multi-layered structure in which unit soft magnetic underlayers are stacked and a spacer is disposed between adjacent unit soft magnetic underlayers.

* * * * *